United States Patent [19]

Dyer et al.

[11] Patent Number: 4,501,258

[45] Date of Patent: Feb. 26, 1985

[54] KERF LOSS REDUCTION IN INTERNAL DIAMETER SAWING

[75] Inventors: Lawrence D. Dyer, Richardson; Anderson D. McGregor, Sherman, both of Tex.

[73] Assignee: Texas Instruments Incorporated, Dallas, Tex.

[21] Appl. No.: 432,508

[22] Filed: Oct. 4, 1982

[51] Int. Cl.³ .................. B28D 1/04; B24B 49/00
[52] U.S. Cl. .................... 125/13 R; 51/267; 51/165.73
[58] Field of Search ............... 51/287, 165.73, 322; 125/12, 13 R; 83/72, 171

[56] References Cited

U.S. PATENT DOCUMENTS

| 2,439,927 | 4/1948 | Haas | 125/12 X |
|---|---|---|---|
| 2,924,873 | 2/1960 | Knowles | 51/267 X |
| 3,905,161 | 9/1965 | Tomita et al. | 51/267 X |
| 4,016,855 | 4/1977 | Mimata | 125/13 R |
| 4,188,934 | 2/1980 | Reinhardt et al. | 125/13 R X |
| 4,209,950 | 7/1980 | Sielmann | 51/267 |
| 4,236,356 | 12/1980 | Ward | 125/13 R X |

FOREIGN PATENT DOCUMENTS 601145 4/1978 U.S.S.R. ..................... 51/165.73

Primary Examiner—James G. Smith
Attorney, Agent, or Firm—Richard A. Bachand; N. Rhys Merrett; Melvin Sharp

[57] ABSTRACT

A system and method for reducing kerf loss and controlling the tension and lateral vibration of an internal diameter saw blade by controlling the temperature of the blade while it is still rotating. The blade temperature is controlled by regulating the temperature of the cutting fluid flow associated therewith. In one embodiment blade tension is periodically measured and, when the tension falls below a predetermined limit, the temperature of the cutting fluid stream is decreased for a period of time until the tension increases to a preselected value.

5 Claims, 1 Drawing Figure

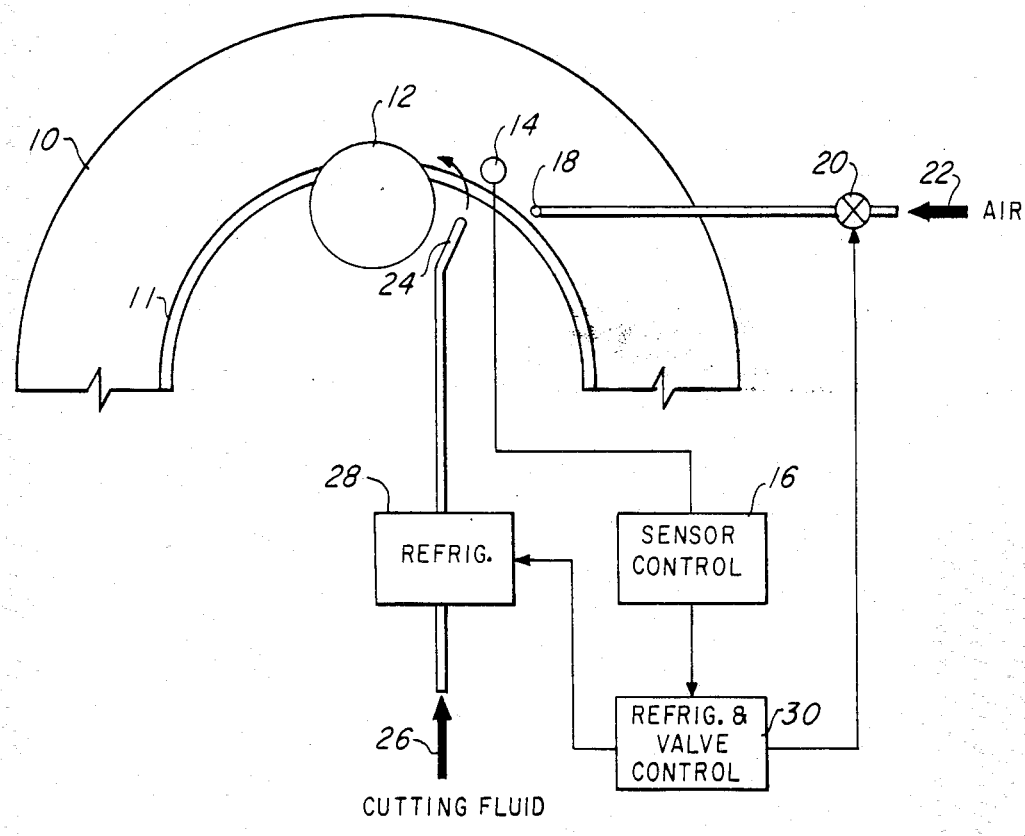

KERF LOSS REDUCTION IN INTERNAL DIAMETER SAWING

BACKGROUND OF THE INVENTION

This invention relates generally to semiconductor wafer processing and more particularly to the optimization of semiconductor sawing using an internal diameter saw.

An internal diameter saw blade is a thin metal annulus having diamond or other abrasive particles bonded to its inner rim to form a cutting edge. The core of a typical saw blade is about 4–5 mils thick and the cutting edge has a thickness of about 10–11 mils. Internal diameter saws are used in semiconductor manufacturing, for example, to cut silicon ingots into wafers. The flatness, depth of damage and edge perfection of a wafer are dependent upon the degree to which the saw blade follows an ideal plane as it traverses the wafer, as well as its freedom from out-of-plane vibration. Lateral vibration increases the kerf loss for each wafer cut, thus decreasing the yield of wafers per ingot. To meet these requirements the saw blade must be kept under a constant, high tension. An improperly tensioned blade will produce bowed or otherwise defective wafers and the useful life of the blade will be diminished, because the blade becomes unstable with respect to deviation under the forces of cutting. Further, the blade becomes free to vibrate with a greater amplitude than a properly tensioned blade.

Methods and apparatus are known in the art for monitoring blade deviation or displacement from a steady-state position as it moves through an ingot. However, these systems do not indicate whether the blade requires retensioning or merely needs dressing. If the blade is dressed when retensioning was the proper course of action, the result will be lower wafer quality and yield. It is known in the art to measure blade tension by applying a force to the blade rim through a force gauge or a balance arm in contact with the blade and then reading deflection with a dial indicator. This method, however, requires stopping of the saw, assembly and calibration of sensitive, precision equipment, and numerous measurements by a skilled operator. This is both expensive and time-consuming.

A system and method for measuring tension while the saw blade is installed and rotating is disclosed in copending application Ser. No. 432,619 filed herewith, entitled "Apparatus and Method For Measuring Saw Blade Flexure," and assigned to the assignee of the present invention. However, retensioning requires stopping the saw and performing an involved tensioning procedure. This is particularly time-consuming in the case of mechanically tensioned saw blades.

SUMMARY OF THE INVENTION

The present invention provides a method and apparatus for reducing kerf loss and controlling the tension and lateral vibration of an internal diameter saw blade by controlling the temperature of the blade while it is still rotating. The blade temperature is controlled by regulating the temperature of the cutting fluid flow associated therewith. In one embodiment blade tension is periodically measured and, when the tension falls below a predetermined limit, the temperature of the cutting fluid stream is lowered for a period of time until the tension increases to a preselected value.

It is therefore an object of the present invention to provide a method for controlling the tension and lateral vibration of an internal diameter saw blade.

Another object of this invention is to provide a method and apparatus for controlling the tension and vibration of an internal diameter saw blade in situ by controlling the temperature of the blade while it is rotating.

Yet another object of this invention is to provide a method and apparatus for reducing kerf loss by in situ control of internal diameter saw blade tension and vibration comprising controlling the temperature of the saw blade cutting fluid stream.

BRIEF DESCRIPTION OF THE DRAWING

The novel features believed characteristic of the invention are set forth in the appended claims. The invention itself, however, as well as further objects and advantages thereof, will be best understood by reference to the following detailed description of illustrative embodiments, when read in conjunction with the accompanying drawing FIGURE which is a schematic elevational view of an internal diameter saw blade tension and vibration control system according to the present invention.

DETAILED DESCRIPTION OF THE INVENTION

Referring now to the drawing FIGURE, there is shown an internal diameter saw blade 10 having an inner cutting edge 11 for sawing wafers from a semiconductor ingot 12. A system for monitoring the tension of blade 10 includes a displacement sensor 14 coupled to an indication and control unit 16, and a nozzle 18 connected to a valve 20 which is in turn connected to a supply of pressurized air, indicated by arrow 22 in the drawing. The details of this system are disclosed in copending application Ser. No. 432,619, incorporated herein by reference. Generally, blade tension is measured before a sewing operation by opening valve 20 which allows pressurized air to flow through nozzle 18 thereby deflecting blade 10. This deflection is detected by sensor 14 which produces an electrical signal corresponding to blade displacement, which is inversely related to blade tension. Indication and control unit 16 provides an analog or digital indication of blade tension responsive to this signal.

Internal diameter saws used for semiconductor wafer cutting generally include blade lubricating means for applying a cutting fluid to the blade before it passes through the saw slot in the semiconductor ingot. Referring to the drawing, a cutting fluid stream is directed at blade 10 by a nozzle 24 adjacent thereto positioned so that the stream flows onto blade 10 before it enters the saw slot.

The present system is similar to the system disclosed in copending application Ser. No. 432,509 filed herewith, entitled "Control Of Internal Diameter Saw Blade Tension In Situ," and assigned to the assignee of the present invention. In that system blade tension is controlled by regulating the temperature of the wash water stream applied to the blade after it passes through the saw slot. The wash water flow rate is normally many times greater than the flow rate of the cutting fluid and, therefore, would be expected to have a correspondingly greater effect on the tension and vibration of the blade. However, it has been found that by controlling the cutting fluid temperature a greater effect on blade tension, vibration and deviation can be achieved than by controlling the wash water flow temperature.

In one embodiment of the present invention the cutting fluid stream, indicated by arrow 26 in the drawing, that normally flows directly to nozzle 24 is first passed through a refrigeration unit 28. If the measured tension of blade 10 in unacceptably low, refrigeration unit 28 is turned on to lower the temperature of the cutting fluid. The cooled cutting fluid stream from nozzle 24 lowers the blade temperature, which in turn increases the blade tension. This has also been found to reduce the amplitude of lateral blade vibration which decreases the kerf loss. In an alternative embodiment refrigeration unit 28 may be set to maintain a predetermined temperature lower than that of the normal cutting fluid stream, and the blade tension may be measured periodically to ensure that it is within an acceptable range.

The above-described system can be automated by including a refrigeration and valve control unit 30 coupled to sensor control unit 16, valve 20, and refrigeration unit 28. Control unit 30 comprises a microprocessor or other control means known in the art, which monitors blade 10 tension by periodically opening valve 20, reading the output of sensor indication and control unit 16, then closing valve 20. If the measured tension falls below a preset limit control unit 30 energizes refrigeration unit 28 to cool the cutting fluid and thus lower the blade temperature and increase blade tension. After the blade tension increases to a preselected value control unit 30 deenergizes refrigeration unit 28.

In one example of the present invention blade 10 was used to cut a silicon ingot three inches in diameter at the rate of 1.5 inches per minute. With a cutting fluid flow of about 12 cc/min. at the normal temperature of about 77 degrees F., blade deviation was measured to be about 0.7 mils. The cutting fluid temperature was then lowered as described above to about 38 degrees F., and the blade deviation was measured to be about 0.2 mils with a corresponding reduction in kerf loss and increase in yield. The measured deviation was one-half that attained in a similar experiment wherein only the wash water flow temperature was controlled.

Therefore, the present invention provides a system and method for controlling internal diameter saw blade tension and vibration during the sawing process by controlling the temperature of the cutting fluid associated therewith.

While the present invention has been described and illustrated with respect to specific embodiments, it is to be understood that various modifications may be made without departing from the spirit and the scope of the invention.

What is claimed is:

1. A method for controlling the tension of an internal diameter saw blade while sawing an object, comprising the steps of:
   directing a stream of fluid onto the cutting edge of said saw blade before said blade enters the object being sawed, wherein some of the fluid enters the cutting region;
   measuring the tension of said saw blade; and
   regulating the fluid temperature responsive thereto.

2. The method of claim 1 wherein said regulating step comprises decreasing the temperature of said fluid until said saw blade tension is increased to a predetermined value.

3. A system for controlling the tension of an internal diameter saw blade while sawing an object, comprising:
   means for directing a stream of fluid onto the cutting edge of said saw blade before said blade enters the object being sawed, whereby the fluid is carried into the cutting area;
   means for regulating the temperature of said fluid to control blade tension; and
   means for measuring the tension of said saw blade coupled to said regulating means, wherein said regulating means is responsive to said measuring means.

4. The system of claim 3 wherein said regulating means comprises means for decreasing the temperature of said fluid until said saw blade tension is increased to within a predetermined tension range.

5. The system of claim 4, further comprising:
   control means coupled to said regulating means and to said measuring means for periodically enabling said measuring means to detect when the blade tension decreases to a value outside of said tension range, and thereafter enabling said regulating means until the blade tension increases to a value within said predetermined tension range.

* * * * *